May 13, 1958     J. GIBSON     2,834,471
TREATMENT OF DOMESTIC SEWAGE
Filed Oct. 15, 1954     2 Sheets-Sheet 1
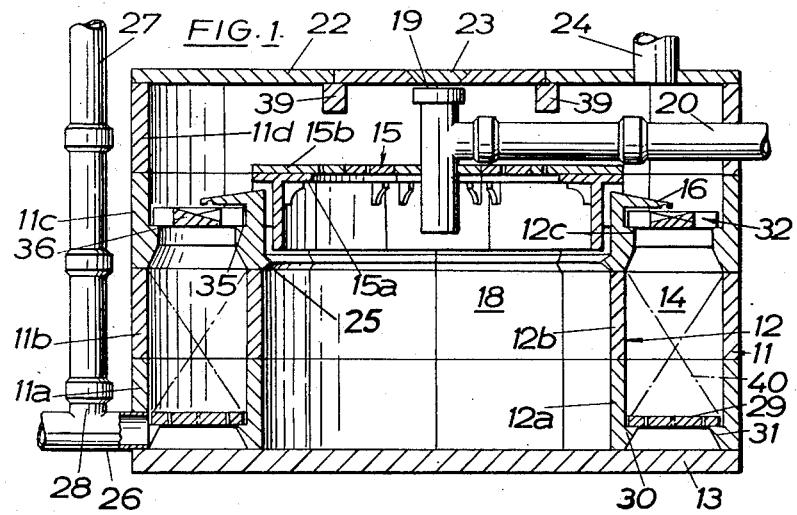
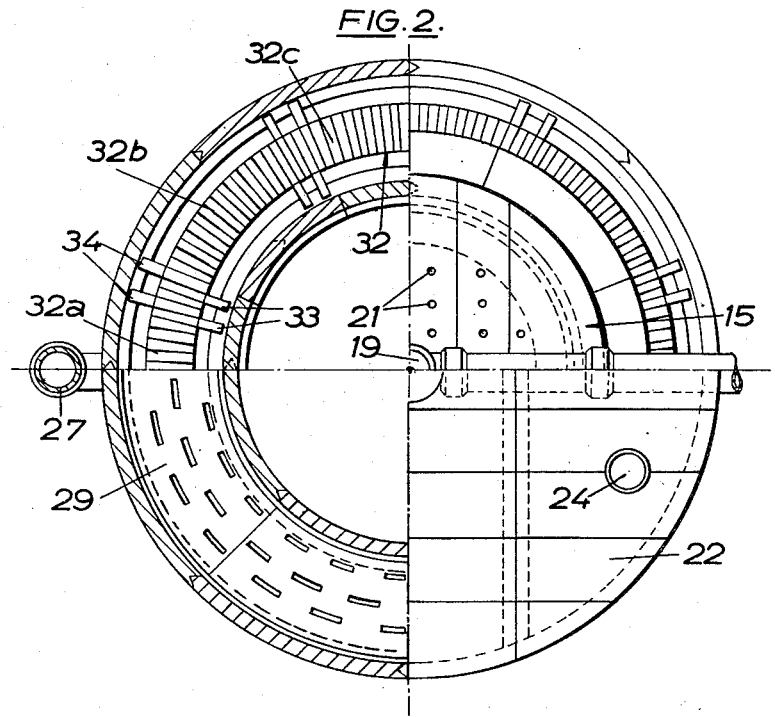
INVENTOR,
JOHN GIBSON May 13, 1958 J. GIBSON 2,834,471
TREATMENT OF DOMESTIC SEWAGE
Filed Oct. 15, 1954 2 Sheets-Sheet 2
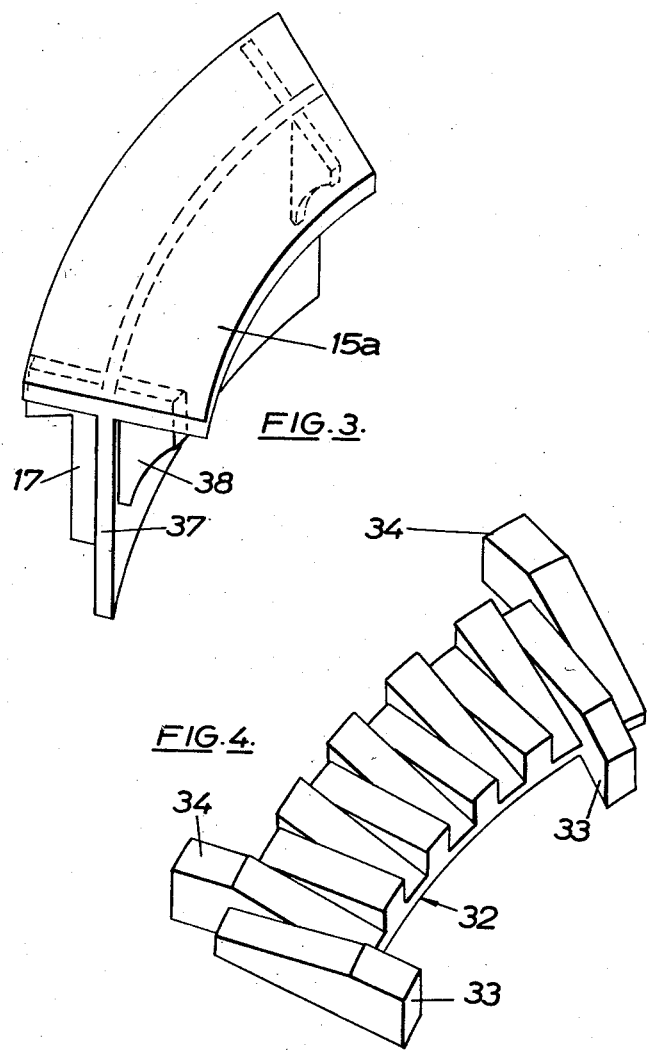
INVENTOR,
JOHN GIBSON

United States Patent Office 2,834,471
Patented May 13, 1958

2,834,471

TREATMENT OF DOMESTIC SEWAGE

John Gibson, Penwortham, Preston, England

Application October 15, 1954, Serial No. 462,549

2 Claims. (Cl. 210—256)

The present invention relates to the treatment of small quantities of domestic sewage and is particularly applicable to isolated dwellings.

An existing method of treating small quantities of domestic sewage consists primarily in installing a septic tank coupled to filter beds or a disposal field. Such a tank may be circular or rectangular in shape, manufactured of concrete or steel and provided with openings for sewage inlet and effluent outlet, this latter being baffled so that liquids are drawn from below the scum surface to prevent floating solids from entering the disposal field. In this case the effluent is not suitable for discharge into a stream or ditch unit it has passed through the filter beds or disposal field.

An object of the invention is to provide a sewage treatment unit which is inexpensive to manufacture, install and maintain and yet has a high degree of efficiency in operation.

Another object of the invention is to provide a completely self-contained sewage treatment unit having no mechanical parts and incorporating both a septic tank having a storage capacity of approximately 600 gallons, and filter beds so that the effluent therefrom can be directly discharged to a nearby river, stream, ditch or culvert.

In order to achieve the above mentioned objects, the unit is preferably built up of precast concrete sections, with the exception of the base which is preferably of concrete cast in situ. Standard glazed earthenware pipes may be provided for sewage inlet and effluent outlet.

More particularly the unit consists of hollow inner and outer cylinders mounted concentrically on a base, filter medium being contained in the annular space formed therebetween and a combined run-off and air inlet chamber being provided below the filter medium. The inner cylinder, which forms the sludge digestion chamber, may be shorter than the outer cylinder and may be provided with an outwardly extending annular sill which forms a drip edge over the annular filter space. In order to utilize the filter media to the full it is preferable to include a spreader below the sill which is designed to guide oncoming liquid in two directions, one being towards the inner vertical surface of the outer cylinder and the other being towards the outer vertical surface of the inner cylinder.

With these and other features as objects in view, an illustrative form of practicing the invention is shown on the accompanying drawings, in which:

Fig. 1 is a vertical section of a sewage treatment unit in accordance with the invention;

Fig. 2 shows plans of the unit at four different levels, in the lower right hand quadrant, a top view of the unit, in the upper right hand quadrant a view with the cover removed, in the upper left hand quadrant a sectional plan view through the wall and the upper part of the inner cylinder to disclose the spreader, and in the lower left hand quadrant a sectional plan view, at a lower level, through the wall and the lower part of the inner cylinder to disclose the perforated support for the filter media;

Fig. 3 is a perspective detail of a segment of the lower supporting section of the scum hood; and Fig. 4 is a perspective detail of a segment of the spreader.

An outer concrete cylinder generally denoted 11, is built up of superimposed sections 11a, 11b, 11c and 11d cemented together. Each section is built up of cement grouted V-jointed segments. An inner cylinder generally denoted by 12, is built up of superimposed sections 12a, 12b and 12c, in a similar manner to the outer cylinder 11 with which it is substantially concentric. The two cylinders 11 and 12 are set on a concrete base 13 cast in situ.

The inner cylinder 12 acts as a sludge digestion chamber 18. The annular space 14 formed between the two cylinders 11 and 12 is filled with any suitable filter media, this latter being the mass contained in the area indicated by chain dotted lines 40.

The upper inner section 12c has an outwardly extending sill 16 formed integrally therewith which acts as a drip edge over the annular filter space 14. An annular two-directional spreader 32, which may be of pre-cast concrete, re-inforced if desired, and a detailed section of which is shown in Fig. 3, is built up of sections 32a, 32b, 32c etc. Integral inner projections 33 and integral outer projections 34 are provided on or near both ends of each spreader section. This spreader provides for a fall towards both walls of the filter space 14.

Inner cylindrical section 12c and outer cylindrical section 11c are provided with oppositely disposed integral ledges, 35 and 36 respectively, on which rests the projections, 33 and 34 respectively, of the spreader sections.

A scum hood generally denoted 15, e. g. of pre-cast concrete, has two main parts, a lower annular part 15a and an upper cover 15b. The annular part 15a may be built up of a plurality of segments, each segment having at least two integral lugs 17 which rest on the sill 16, and a dependent integral wall 37 following the curve of the segment. This wall 37 acts as a buffer for the scum in the digestion chamber 18. At least two integral supporting stay members 38 are provided on each segment 15a. The upper cover 15b may be constructed in any manner suitable for easy handling, and as illustrated in the upper right hand quadrant of Fig. 2, the sections of the cover have parallel joints, each section resting on the lower annular part 15a of the scum hood and the central section having an opening 19 through which an affluent inlet pipe 20 passes into the digestion chamber 18. Sludge gases forming in the digestion chamber can escape through a plurality of vents 21 formed in the scum hood cover 15b.

The upper outer cylindrical section 11d is recessed (not shown) to receive beams 39 e. g. of reinforced concrete. A cover 22, e. g. of concrete, may be formed of several sections for easy handling; these sections rest on the upper outer cylinder 11d and the beams 39.

When a predetermined maximum quantity of sludge has accumulated in the bottom of the digestion chamber 18 it is necessary to remove it and for this purpose the vertical section of the affluent inlet pipe 20 is provided with a removable plug 23; the sludge is removed for example by means of a suction pump. The cover 22 is provided with a ventilator outlet 24.

The upper internal cylinder 12c has an integral internally extending baffle 25 at its lower edge. This baffle prevents sludge particles, which may be disturbed by rising sludge gases, from passing to the filter medium.

The affluent inlet pipe 20 is led through the upper outer cylinder 11d and an effluent outlet pipe 26 is led through the lower outer cylinder 11a. Ventilation is provided by means of a pipe 27, carried up to ground level, from an outlet junction 28 forming the air inlet.

The ventilating air, entering below the filter medium in annular space 14, is distributed by means of perforated concrete or clay segments 29 which also act as a support for the filter media. These segments 29 rest on projections 30 and 31 formed on adjacent surfaces near the bases of the lower cylinders 12a and 11a respectively.

The affluent inlet pipe 20 allows incoming sewage to be delivered into the sludge digestion chamber 18, below the level of the scum, with a minimum of tank disturbance. Liquefaction and settlement are effected in this chamber and any given quantity of sewage entering displaces a similar quantity over the drip edge 16 onto the annular two-directional spreader 32, which latter distributes the liquid onto the filter medium 40, and it is rapidly disseminated throughout the whole filter mass. The whole filter mass is thus brought into operation for even the smallest amount of sewage.

The ventilation system in this filter allows air access to the full extent of the filter base by means of the combined run-off and air chamber. This ensures a constant supply of air, providing the necessary free oxygen to the nitrifying bacteria throughout the whole filter mass. Where the effluent discharges into a nearby stream the vertical air inlet may be omitted, and where there is a nearby soil ventilating pipe the air outlet at the cover may be omitted.

The tank is designed with a sludge accommodation calculated for six months, its removal being effected either by withdrawing the plug 23 and inserting a suction pump as previously described, or by removal of part of the cover and one or more sections of the scum hood whereby the inner chamber 18 is exposed, and scooping the sludge out.

I claim:

1. A self-contained domestic sewage treatment unit comprising inner and outer chambers formed inside inner and outer co-axial concentric cylinders, said inner chamber being a sewage digestion chamber connected to an affluent inlet pipe and said outer chamber being an annular filter chamber, containing filter media, connected to an effluent discharge pipe, said inner cylinder being shorter than said outer cylinder and said inner cylinder being provided with an annular ring constructed in segments which co-operate to form a drip edge extending half way over said filter media, below said ring an imperforate annular spreader plate positioned over said filter media and adapted to guide liquid, coming from said inner digestion chamber by way of said drip edge, radially inwardly and outwardly substantially uniformly over the filter media and a scum hood extending over said inner chamber so as to prevent substantially the passage of scum from said inner digestion chamber on to said filter media.

2. A self-contained domestic sewage treatment unit comprising inner and outer chambers formed inside inner and outer co-axial concentric cylinders, said inner chamber being a sewage digestion chamber connected to an affluent inlet pipe and said outer chamber being an annular filter chamber, containing filter media, connected to an effluent discharge pipe, said inner cylinder being shorter than said outer cylinder and said inner cylinder being provided with an annular ring constructed in segments which co-operate to form a drip edge extending half way over said filter media, below said ring an imperforate annular spreader plate positioned over said filter media and adapted to guide liquid, coming from said inner digestion chamber by way of said drip edge, radially inwardly and outwardly substantially uniformly over the filter media, said spreader plate comprising arcuate segments consisting of a plurality of wedge-shaped members mounted such that their upper surfaces are alternately inclined in opposite directions relative to each other, certain of said wedge-shaped members being extended outwardly and certain of said wedge-shaped members being extended inwardly to engage respectively with projections provided on the inner surface of the outer cylinder and on the outer surface of the inner cylinder and a scum hood extending over said inner chamber so as to prevent substantially the passage of scum from said inner digestion chamber on to said filter media.

References Cited in the file of this patent

UNITED STATES PATENTS

| 1,002,089 | Sofleiss | Aug. 29, 1911 |
| 1,033,011 | Helmich | July 16, 1912 |
| 1,057,642 | Helmich | Apr. 1, 1913 |
| 2,483,564 | Sitton | Oct. 4, 1949 |

FOREIGN PATENTS

| 23,688 | Great Britain | of 1908 |
| 450,422 | Great Britain | July 17, 1936 |